US012726802B2

(12) United States Patent
Yokota et al.

(10) Patent No.: US 12,726,802 B2
(45) Date of Patent: Sep. 1, 2026

(54) COMMUNICATION CONTROL METHOD, TERMINAL, AND COMMUNICATION SYSTEM

(71) Applicant: Panasonic Intellectual Property Management Co., Ltd., Osaka (JP)

(72) Inventors: Tomohiro Yokota, Kyoto (JP); Mariko Nakaso, Shiga (JP); Masafumi Okubo, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 333 days.

(21) Appl. No.: 18/703,220

(22) PCT Filed: Sep. 27, 2023

(86) PCT No.: PCT/JP2023/035299
§ 371 (c)(1),
(2) Date: Apr. 19, 2024

(87) PCT Pub. No.: WO2024/090114
PCT Pub. Date: May 2, 2024

(65) Prior Publication Data

US 2025/0234175 A1 Jul. 17, 2025

(30) Foreign Application Priority Data

Oct. 28, 2022 (JP) ................................ 2022-173164

(51) Int. Cl.
*H04W 4/80* (2018.01)
*H04W 76/10* (2018.01)

(52) U.S. Cl.
CPC ............ *H04W 4/80* (2018.02); *H04W 76/10* (2018.02)

(58) Field of Classification Search
CPC ....... H04W 4/80; H04W 48/10; H04W 76/10; H04W 76/14; H04W 8/005; H04W 92/18
See application file for complete search history.

(56) References Cited

U.S. PATENT DOCUMENTS

2005/0048929 A1 3/2005 Ogino
2011/0231559 A1 9/2011 Yamaguchi
(Continued)

FOREIGN PATENT DOCUMENTS

JP 2005-076375 A 3/2005
JP 2011-199408 A 10/2011
(Continued)

OTHER PUBLICATIONS

International Search Report dated Dec. 5, 2023 issued in International Patent Application No. PCT/JP2023/035299.
(Continued)

*Primary Examiner* — Nguyen T Vo
(74) *Attorney, Agent, or Firm* — RIMON P.C.

(57) ABSTRACT

A communication control method executed by a terminal that performs short-range wireless communication with a device, includes setting a first period by using the timings of connections established by the terminal via the short-range wireless communication in response to a notification signal from the device, the first period being a period in which the terminal performs a reception awaiting operation to await a new notification signal from the device and performing the reception awaiting operation to await the new notification signal from the device, at a first frequency in the first period set and at a second frequency less frequent than the first frequency in a second period other than the first period set.

14 Claims, 10 Drawing Sheets

(56) References Cited

U.S. PATENT DOCUMENTS

| | | | | |
|---|---|---|---|---|
| 2013/0017787 | A1 | 1/2013 | Eshita | |
| 2015/0145693 | A1 | 5/2015 | Toriumi et al. | |
| 2018/0063876 | A1* | 3/2018 | Torikai | H04W 76/10 |
| 2020/0112910 | A1* | 4/2020 | Cherian | H04W 72/0446 |
| 2020/0146548 | A1 | 5/2020 | Kubo et al. | |
| 2021/0067727 | A1 | 3/2021 | Yu et al. | |
| 2022/0095393 | A1 | 3/2022 | Matsumoto et al. | |

FOREIGN PATENT DOCUMENTS

| | | | | |
|---|---|---|---|---|
| JP | 2013-021476 | A | 1/2013 | |
| JP | 2014-160984 | A | 9/2014 | |
| JP | 2019-033453 | A | 2/2019 | |
| WO | WO-2014080252 | A1 * | 5/2014 | H04W 52/00 |
| WO | 2014/115325 | A1 | 7/2014 | |
| WO | 2020/174737 | A1 | 9/2020 | |

OTHER PUBLICATIONS

Extended European Seach Report dated Jan. 21, 2026 issued in the corresponding European Patent Application No. 23875921.1.

* cited by examiner

Figure 1:
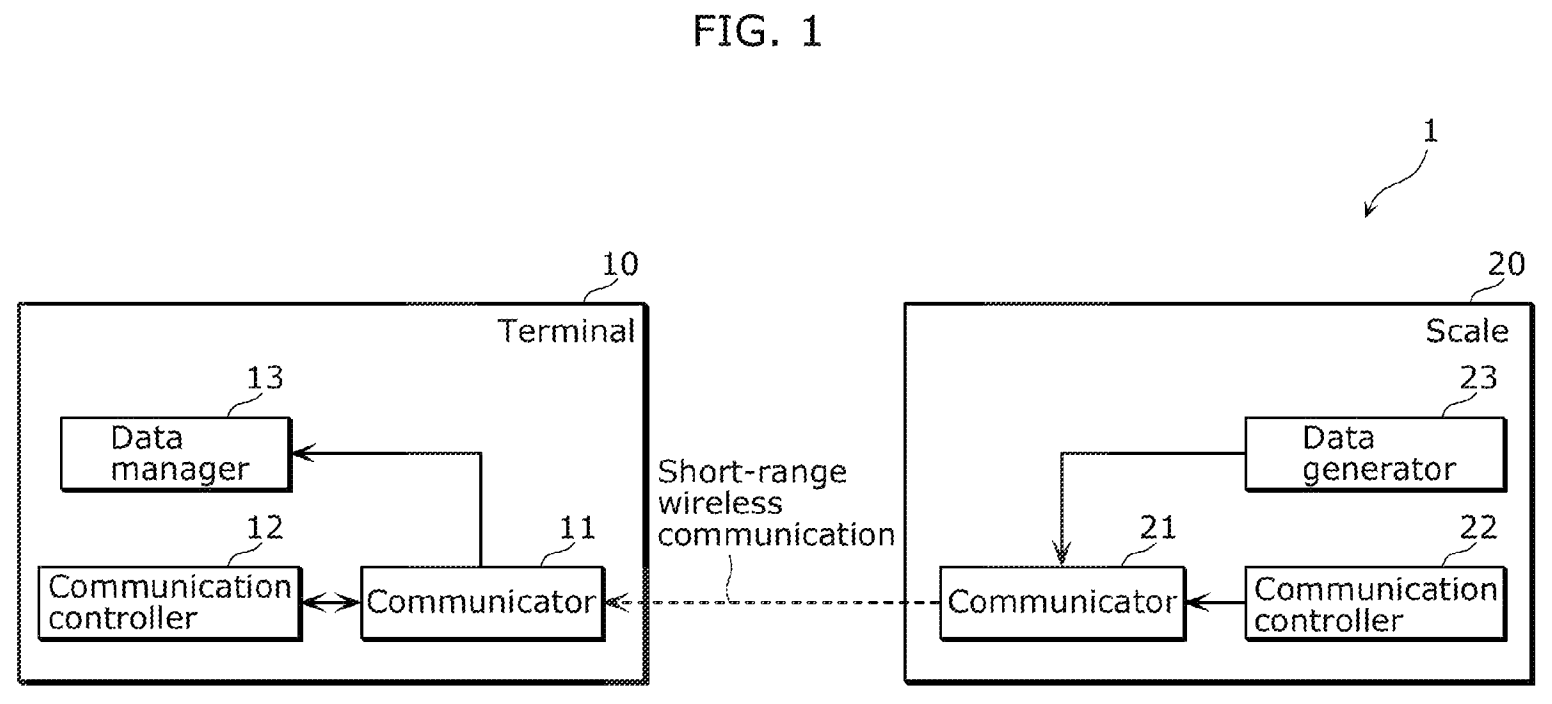

20 Scale

23 Data generator

22 Communication controller

21 Communicator

Short-range wireless communication

10 Terminal

11 Communicator

13 Data manager

12 Communication controller

Time
T2
T3
Reception awaiting operation by terminal
Weighting and transmission of advertising signal performed by scale

FIG. 7

| Time slot | Number of connections |
|---|---|
| 12:00 a.m. to 12:59 a.m. | 0 |
| ... | ... |
| 4:00 a.m. to 4:59 a.m. | 0 |
| 5:00 a.m. to 5:59 a.m. | 1 |
| 6:00 a.m. to 6:59 a.m. | 25 |
| 7:00 a.m. to 7:59 a.m. | 2 |
| 8:00 a.m. to 8:59 a.m. | 2 |
| 9:00 a.m. to 9:59 a.m. | 0 |
| 10:00 a.m. to 10:59 a.m. | 0 |
| 11:00 a.m. to 11:59 a.m. | 0 |
| ... | ... |
| 11:00 p.m. to 11:59 p.m. | 0 |

S203
Start
S301
Reception awaiting period came?
No
Yes
S302
Perform reception awaiting operation
S303
Advertising signal has been received?
No
Yes
S304
Transmit connection request signal
S305
Establish connection
S306
Receive data from scale
S311
Perform error processing
S307
Disconnect connection
S308
Manage data
End

COMMUNICATION CONTROL METHOD, TERMINAL, AND COMMUNICATION SYSTEM

This application is the U.S. National Phase under 35 U.S.C. § 371 of International Patent Application No. PCT/JP2023/035299, filed on Sep. 27, 2023, which in turn claims the benefit of Japanese Patent Application No. 2022-173164, filed on Oct. 28, 2022, the entire disclosures of which Applications are incorporated by reference herein.

TECHNICAL FIELD

The present disclosure relates to a communication control method, a terminal, and a communication system.

BACKGROUND ART

When two devices that perform short-range wireless communication are brought into proximity to one another, if predetermined conditions are met, a connection is established via short-range wireless communication by using a past connection history of the two devices. Such a technique is commonly known (see Patent Literature (PTL) 1, for example).

CITATION LIST

Patent Literature

[PTL 1] International Publication WO2020/174737

SUMMARY OF INVENTION

Technical Problem

According to the technique disclosed in PTL 1, occurrence of two devices being brought into proximity to one another is detected by processing using a signal different from a signal used in short-range wireless communication. Power is consumed when the devices perform the above processing. Thus, a large amount of power is consumed to establish a short-range wireless communication connection when the two devices are brought into proximity to one another.

The present disclosure provides a communication control method, a terminal, a program, and a communication system that establish a short-range wireless communication connection while suppressing power consumption.

Solution to Problem

A communication control method in the present disclosure executed by a terminal that performs short-range wireless communication with a device, the communication control method including: setting a first period by using the timings of connections established by the terminal via the short-range wireless communication in response to a notification signal from the device, the first period being a period in which the terminal performs a reception awaiting operation to await a new notification signal from the device; performing the reception awaiting operation at a first frequency in the first period set; and performing the reception awaiting operation at a second frequency less frequent than the first frequency in a second period other than the first period set.

Advantageous Effects of Invention

By performing the communication control method in the present disclosure, it is possible to establish a short-range wireless communication connection while suppressing power consumption.

BRIEF DESCRIPTION OF DRAWINGS

FIG. 1 is a diagram to explain a communication system in an embodiment.

FIG. 7 illustrates an example of a connection history in the embodiment.

Figure 2:
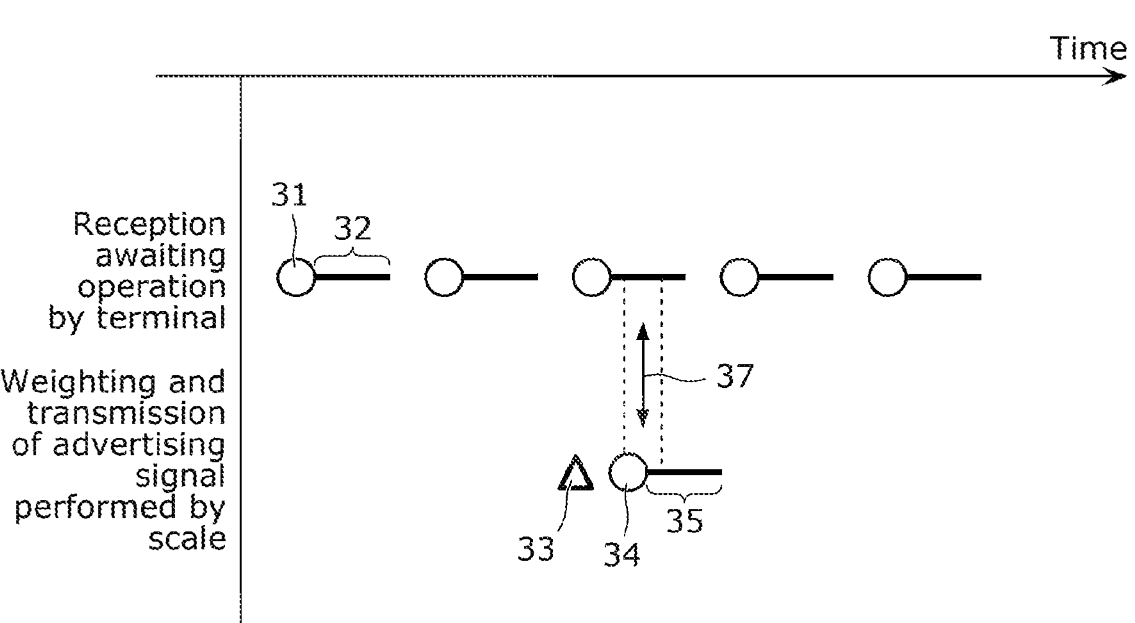
FIG. 2 illustrates basic operations in the communication system in the embodiment that are reception awaiting operations by a terminal and weighting and transmission of an advertising signal by a scale.

DESCRIPTION OF EMBODIMENTS (Underlying Knowledge Forming Basis of the Present Disclosure)

The inventors of the present inventions discovered the following issues regarding the short-range wireless communication technique stated in Background Art.

In the above technique, occurrence of two devices being brought into proximity to one another is detected by processing using a beacon signal different from a signal used in short-range wireless communication. Power is consumed when the devices perform the above processing, that is, the devices transmit or receive a beacon signal. Thus, a large amount of power is consumed to establish a short-range wireless communication connection when the two devices are brought into proximity to one another.

In view of this, the inventors of the present inventions discovered the possibility of being able to establish a short-range wireless communication connection while suppressing power consumption, by not using a signal different from a signal used in short-range wireless communication to establish a short-range wireless communication connection when two devices that perform short-range wireless communication are brought into proximity to one another.

Inventions obtained from the disclosure of the Specification are exemplified, and advantageous effects obtained from the inventions are described.

(1) A communication control method executed by a terminal that performs short-range wireless communication with a device, the communication control method including: setting a first period by using the timings of connections established by the terminal via the short-range wireless communication in response to a notification signal from the device, the first period being a period in which the terminal performs a reception awaiting operation to await a new notification signal from the device; performing the reception awaiting operation at a first frequency in the first period set; and performing the reception awaiting operation at a second frequency less frequent than the first frequency in a second period other than the first period set.

According to the above aspect, the terminal will perform the reception awaiting operation to await the notification signal at a relatively high frequency in the future first period. Thus, when the device transmits the notification signal in the future first period, the terminal can receive the notification signal at a relatively early timing. This enables early completion of data transmission, which can contribute to suppression of power consumption. Furthermore, the terminal performs the reception awaiting operation at a low frequency in the second period. This can suppress power consumption in the second period while enabling the terminal to receive the notification signal even when the device transmits the notification signal in the second period. By performing the above communication control method, it is possible to establish a short-range wireless communication connection while suppressing power consumption.

(2) The communication control method according to (1), in which in the performing of the reception awaiting operation at the first frequency, the terminal consecutively performs the reception awaiting operation.

In the above aspect, the terminal will consecutively perform the reception awaiting operation to await the notification signal in the future first period. Thus, when the device transmits the notification signal in the future first period, the terminal can receive the notification signal at an earlier timing. This enables even earlier completion of data transmission, which can further contribute to suppression of power consumption. By performing the above communication control method, it is possible to establish a short-range wireless communication connection while further suppressing power consumption.

(3) The communication control method according to (1) or (2), in which in the setting of the first period, one or more time slots in a day that include the timings of the connections are set as one or more first periods, each of which is the first period.

In the above aspect, one or more time slots that are included in a day and in which short-range wireless communication has been performed before can be set as one or more future first periods. By doing so, when a user who tends to use the device in a particular time slot in a day uses the device in the future, the terminal can receive the notification signal at a relatively early timing. Thus, by performing the above communication control method, it is possible to establish a short-range wireless communication connection while further suppressing the power consumption of the device regularly used by the user.

(4) The communication control method according to any one of (1) to (3), further including: setting a third period that is a time slot in which the terminal has not established the connections before, the third period being a time slot in a day included in the second period; and prohibiting the terminal from performing the reception awaiting operation in the third period set In the above aspect, the terminal prohibits performance of the reception awaiting operation in the third period, which can further suppress power consumption in the third period. The third period is a period in which a short-range wireless communication connection has not been established before. Thus, it is expected that there will be a very low probability of a short-range wireless communication connection being established in the future third period. As such, it is expected that there will be a very low probability of causing obstruction to short-range wireless communication between the terminal and the device even if the terminal prohibits performance of the reception awaiting operation in the future third period. By performing the above communication control method, it is possible to establish a short-range wireless communication connection while further suppressing power consumption.

(5) The communication control method according to (3), further including: obtaining position information on the position of the terminal in association with a time slot in a day, in which in the setting of the first period, one or more time slots that are included in a day and in which the terminal is at a position at which the terminal is able to perform the short-range wireless communication with the device are further set as the one or more first periods.

In the above aspect, one or more time slots that are included in a day and in which the terminal was present at a position at which the terminal can communicate with the device are set as one or more future first periods. Thus, when the terminal is at a position that is relatively near the device in a particular time slot in a day because of user's living habits, the terminal can receive the notification signal at a relatively early timing. Accordingly, in the above communication control method, by using the position of the terminal based on the user's living habits, it is possible to establish a short-range wireless communication connection while further suppressing power consumption.

(6) The communication control method according to any one of (1) to (5), further including: obtaining position information on the position of the terminal; determining, using the position information, whether the terminal is at a position at which the terminal is able to perform the short-range wireless communication with the device; and prohibiting the terminal from performing the reception awaiting operation, when the terminal is determined not to be at the position at which the terminal is able to perform the short-range wireless communication with the device.

In the above aspect, it is possible to suppress power consumption by prohibiting performance of the reception awaiting operation when the terminal is not at a position at which the terminal can perform short-range wireless communication with the device. When the terminal is not at a position at which the terminal can perform short-range wireless communication with the device, even if the device transmits the notification signal, the notification signal does not reach the terminal, and thus the terminal does not receive the notification signal. Thus, there is no need for the terminal to perform the reception awaiting operation in the above case. Accordingly, in the above communication control method, by using the position of the terminal, it is possible to establish a short-range wireless communication connection while further suppressing power consumption.

(7) The communication control method according to any one of (1) to (6), in which the terminal includes a communicator that performs the short-range wireless communication with the device, when performing the reception awaiting operation in the first period, control to start the reception awaiting operation is repeatedly performed on the communicator at the first frequency in the first period, and the control is repeatedly performed at the second frequency in the second period.

In the above aspect, the terminal performs the control to start the reception awaiting operation at the first frequency in the first period and at the second frequency in the second period. In this way, the terminal can readily perform the reception awaiting operations in each period. Thus, by performing the above communication control method, it is possible to establish a short-range wireless communication connection more readily while further suppressing power consumption.

(8) The communication control method according to any one of (1) to (7), in which the device is a measurement instrument, and when receiving the new notification signal during the reception awaiting operation, the terminal establishes a connection via the short-range wireless communication in response to the new notification signal, and receives, via the short-range wireless communication, data generated as a result of measurement by the device.

In the above aspect, the terminal can establish a short-range wireless communication connection while suppressing power consumption and receive the data generated by the measurement instrument.

(9) The communication control method according to any one of (1) to (8), in which the short-range wireless communication is a wireless communication complying with a Bluetooth (registered trademark) low energy (BLE) standard.

In the above aspect, the terminal can establish a connection via BLE, which is a short-range wireless communication, while suppressing power consumption.

(10) A communication control method of a communication system including a device and a terminal that performs short-range wireless communication with the device, in which the terminal executes the communication control method according to (1).

In the above aspect, effects similar to those obtained from the above communication control method can be obtained.

(11) The communication control method according to (10), in which the device is a measurement instrument and transmits the notification signal in a predetermined period after measurement, and the terminal receives the notification signal from the device and sets the first period by using the notification signal received.

In the above aspect, the terminal sets the first period by using the notification signal transmitted in the predetermined period that is after measurement by the device, which is the measurement instrument. This enables early completion of data communication between the terminal and the device (the measurement instrument), which can contribute to suppression of power consumption. Thus, by performing the above communication control method, it is possible to establish a short-range wireless communication connection while suppressing power consumption.

(12) The communication control method according to (11), in which the device measures time periods that have been taken to establish the connections since the device transmitted the notification signal, sets the length of time of the predetermined period by using the time periods measured, and transmits the notification signal by using the length of time set.

In the above aspect, the time length of the predetermined period is set according to the time periods taken from transmission of the notification signal to connection establishment. Thus, it is possible to adjust the time length of the predetermined period to a minimum required time length, according to the time periods taken from the transmission of the notification signal to the connection establishment. This can suppress power consumption. By performing the above communication control method, it is possible to establish a short-range wireless communication connection while further suppressing power consumption.

(13) A terminal that performs short-range wireless communication with a device, the terminal including: a communicator that performs the short-range wireless communication with the device; and a communication controller that sets a first period by using the timings of connections established by the terminal via the short-range wireless communication in response to a notification signal from the device, the first period being a period in which the communicator performs a reception awaiting operation to await a new notification signal from the device, in which the communicator performs the reception awaiting operation to await the new notification signal from the device, at a first frequency in the first period set and at a second frequency less frequent than the first frequency in a second period other than the first period set.

In the above aspect, effects similar to those obtained from the above communication control method can be obtained.

(14) A communication system including: the terminal according to (13); and the device that performs the short-range wireless communication with the terminal.

In the above aspect, effects similar to those obtained from the above communication control method can be obtained.

An embodiment is described below in detail with reference to the drawings. However, unnecessary detailed explanations may be omitted. For instance, detailed explanations for well-known matters and overlapping explanations for substantially the same elements may be omitted. This is to avoid a lengthy explanation and facilitate understanding for those skilled in the art.

It should be noted that the appended drawings and the following descriptions are provided to help those skilled in the art sufficiently understand the present disclosure and do not intend to limit the subject matter recited in the claims.

Embodiment

In an embodiment, a communication control method for establishing a short-range wireless communication connection while suppressing power consumption is described.

FIG. 1 is a diagram to explain communication system 1 in an embodiment. A communication control method of communication system 1 is described with reference to FIG. 1.

As illustrated in FIG. 1, communication system 1 includes terminal 10 and scale 20. Terminal 10 and scale 20 are communicable with one another via short-range wireless communication. Each of terminal 10 and scale 20 is portable. When terminal 10 and scale 20 are within a distance within which short-range wireless communication can be performed, terminal 10 and scale 20 can communicate with each other via short-range wireless communication.

Terminal 10 is an information processing device that obtains a measured value from scale 20 and holds the measured value. Terminal 10 is, for example, a smartphone, a tablet computer, or a personal computer.

Terminal 10 includes communicator 11, communication controller 12, and data manager 13.

Communicator 11 is a communication interface that performs short-range wireless communication. Communicator 11 includes hardware necessary for wireless communication, such as an antenna and a wireless circuit, and communicates with scale 20 (more specifically, communicator 21 of scale 20) by radio waves. The short-range wireless communication is, for example, a communication system in which it is possible to communicate with a communication counterpart present within a predetermined distance (around several meters) and not possible to communicate with a communication counterpart present more than the predetermined distance away. Here, the case in which the short-range wireless communication is a wireless communication complying with the Bluetooth low energy (BLE) standard is described as an example. It should be noted that another example of the short-range wireless communication includes Bluetooth Classic or Wi-Fi (registered trademark).

Under control of communication controller 12, communicator 11 performs a reception awaiting operation to await a notification signal from scale 20. The notification signal is the first communication signal transmitted for communication between scale 20 and terminal 10. The notification signal in the BLE standard is an advertising signal, and an example in which an advertising signal is used as the notification signal is described below. The reception awaiting operation is an operation to await, in one or more communication channels (generally, referred to as advertisement channels), an advertising signal transmitted from scale 20 while scanning the one or more communication channels via which there is a possibility of scale 20 transmitting the advertising signal.

Communicator 11 performs the reception awaiting operation at a first frequency in a first period set by communication controller 12 and at a second frequency in a second period set by communication controller 12. The second frequency is less frequent than the first frequency.

It should be noted that communicator 11 may consecutively perform the reception awaiting operation in the first period. In other words, communicator 11 may perform the reception awaiting operation continuously, time-wise, that is, seamlessly, time-wise during the first period.

When receiving the notification signal from scale 20 during the reception awaiting operation, communicator 11 performs processing to establish a BLE connection with scale 20. After that, communicator 11 receives data including a measured value from scale 20 through the established connection and then disconnects from scale 20. Communicator 11 provides data manager 13 with the received data.

In addition, under control of communication controller 12, communicator 11 may be prohibited from performing the reception awaiting operation in a third period set by communication controller 12.

Communication controller 12 is a functional part for controlling the operation of communicator 11. Communication controller 12 is implemented by the processor (e.g., a central processing unit (CPU)) of terminal 10 executing a predetermined program.

Communication controller 12 sets periods related to the operation of communicator 11, and controls the operation of communicator 11 by using the set periods.

Communication controller 12 sets at least the first period as the period related to the operation of communicator 11. The first period is a period in which communicator 11 performs the reception awaiting operation to await a new notification signal from scale 20.

Communication controller 12 sets the first period by using the timings of BLE connections established by communicator 11 in response to the notification signal from scale 20. As one or more first periods, communication controller 12 can set one or more time slots in a day that include the timings of the BLE connections established by communicator 11 in response to the notification signal from scale 20.

Furthermore, using position information on the position of terminal 10, communication controller 12 may set, as the one or more first periods, one or more time slots that are included in a day and in which terminal 10 is at a position at which the terminal can establish a BLE connection with scale 20. For instance, position information obtained by the position sensor (e.g., a global positioning system (GPS) receiver) (not illustrated) of terminal 10 can be used as the position information on the position of terminal 10.

It should be noted that the period other than the first period is also referred to as the second period. In other words, communication controller 12 sets the second period by setting the first period.

After setting the first period and the second period, communication controller 12 sets periods during which communicator 11 performs the reception awaiting operation, in each of the first period and the second period. At this time, communication controller 12 provides a reception awaiting period at the first frequency in the first period and at the second frequency in the second period. Then, by providing communicator 11 with information indicating reception awaiting periods, communication controller 12 causes communicator 11 to perform the reception awaiting operation at the first frequency in the first period and at the second frequency in the second period.

In addition, communication controller 12 sets the third period as one of the above periods. As the third period, communication controller 12 sets a time slot in which a BLE connection has not been established before, the third period being a time slot in a day included in the second period. After setting the third period, communication controller 12 controls communicator 11 to prohibit communicator 11 from performing the reception awaiting operation in the third period.

It should be noted that by using the position information on the position of terminal 10, communication controller 12 may prohibit communicator 11 from performing the reception awaiting operation. Communication controller 12 can obtain the position information on the position of terminal 10 and determine whether the position of terminal 10 indicated in the position information is a position at which terminal 10 can perform BLE standard communication with scale 20. When determining that terminal 10 is not at a position at which terminal 10 can perform BLE standard communication with scale 20, communication controller 12 can prohibit communicator 11 from performing the reception awaiting operation.

Data manager 13 is a functional part for obtaining and managing data obtained from scale 20 and including a measured value. Data manager 13 obtains the data via communicator 11.

Data manager 13 may be implemented by the processor (e.g., the CPU) of terminal 10 executing a predetermined program, and include a storage device (e.g., semiconductor memory) of terminal 10. Data managed by data manager 13 can be used for a variety of purposes. For instance, the data managed by data manager 13 can be converted into a graph chronologically indicating measured values and displayed on the display screen (not illustrated) of terminal 10. In addition, the data managed by data manager 13 can be transmitted to a management server (not illustrated), where statistical processing is performed on the data or knowledge of an expert is added to the data. Then, the data can be provided to a user and used for health management.

Scale 20 is a measurement instrument for weighting the user. Scale 20 weights the user and obtains a measured value indicating the weight of the user. Then, scale 20 transmits data including the obtained measured value to terminal 10 via BLE standard communication. For instance, scale 20 is switched on by user operation when the user wants to measure their weight. The user operation may be the operation in which the user operates the on-button of scale 20 or the operation in which the user steps on scale 20.

After finishing weighting the user, scale 20 transmits the data including the measured value to terminal 10, and then scale 20 is switched off. Scale 20 may be automatically switched off when a predetermined period has elapsed since scale 20 weighted the user or transmitted the data. Alternatively, scale 20 may be switched off by the user operating the off-button of scale 20.

It should be noted that if scale 20 has a function to manage the current time, scale 20 may be switched on when the time that is predetermined as the time to switch on scale 20 (also referred to as switch-on time) comes. The switch-on time can be time set by terminal 10. In this case, scale 20 can obtain the switch-on time by receiving data indicating the switch-on time transmitted by terminal 10 when the previous BLE connection was established between terminal 10 and scale 20.

Switching on performed when the switch-on time comes can be used to transmit data to terminal 10 if scale 20 fails to transmit the data to terminal 10, the data including the measured value of the weight measured by scale 20 in the past. After switching on is performed in response to arrival of the switch-on time, scale 20 transmits data to terminal 10 and then is switched off. It should be noted that communication controller 12 of terminal 10 may set the first period so that the switch-on time is included in the first period.

As illustrated in FIG. 1, scale 20 includes communicator 21, communication controller 22, and data generator 23.

Communicator 21 is a communication interface that performs short-range wireless communication. Communicator 21 includes hardware necessary for wireless communication, such as an antenna and a wireless circuit, and communicates with terminal 10 (more specifically, communicator 11 of terminal 10) by radio waves. The communication standard of the short-range wireless communication is the same as that of the short-range wireless communication performed by communicator 11 of terminal 10. Here, as an example, the short-range wireless communication is described as a wireless communication complying with the BLE standard.

Communicator 21 transmits the advertising signal under control of communication controller 22. More specifically, under control of communication controller 22, communicator 21 transmits the advertising signal in a predetermined period (also referred to as an advertising period) after the weight is measured. More specifically, communicator 21 sequentially selects one advertisement channel from among one or more advertising channels in the advertising period, and repeatedly transmits the advertising signal in the selected advertisement channel.

In addition, communicator 21 performs processing to establish a BLE connection when the advertising signal transmitted by communicator 21 is received by communicator 11 awaiting in the communication channel through which the advertising signal was transmitted. Then, communicator 21 transmits the data including the measured value to terminal 10 through the established connection and then disconnects from terminal 10.

It should be noted that communicator 21 measures the time periods that have been taken to establish connections since transmission of the advertising signal, and may set the time length of the advertising period by using the above time periods measured.

Communication controller 22 is a functional part for controlling operation of communicator 21. Communication controller 22 is implemented by the processor (e.g., a CPU) of scale 20 executing a predetermined program.

By controlling communicator 21, communication controller 22 causes communicator 21 to transmit the advertising signal, which is the notification signal.

For instance, by controlling communicator 21, communication controller 22 causes communicator 21 to transmit the advertising signal in the advertising period. The advertising period starts, for example, within several seconds to several minutes of measurement of weight by scale 20, and the advertising period ends after, for example, about 10 minutes of the start of the advertising period.

Data generator 23 is a functional part for generating data including a measured value obtained as a result of measurement by scale 20. Data generator 23 is implemented by the processor (e.g., the CPU) of scale 20 executing a predetermined program. After scale 20 weights the user, data generator 23 generates data including the user's weight as a measured value and provides communicator 21 with the generated data. Then, the data is transmitted from communicator 21 to terminal 10 and managed by terminal 10.

It should be noted that a measurement instrument for measuring another value can be used as an alternative to scale 20. Another example of the measurement instrument may include a clinical thermometer for measuring the body temperature of the user, a sphygmomanometer for measuring the blood pressure of the user, or an activity meter for measuring the amount of activity of the user (e.g., the number of steps taken in walking).

FIG. 2 illustrates basic operations in communication system 1 in the embodiment that include the reception awaiting operation by terminal 10 and weighting and transmission of the advertising signal by scale 20.

The upper part of FIG. 2 illustrates timings of control 31 performed by terminal 10 and reception awaiting periods 32.

When terminal 10 performs the reception awaiting operation to await the advertising signal, communication controller 12 performs control 31 to cause communicator 11 to perform the reception awaiting operation to await the advertising signal. In this case, communicator 11 performs the reception awaiting operation during reception awaiting period 32 that is a predetermined period starting when control 31 is performed on communicator 11. When reception awaiting period 32 ends, communicator 11 stops the reception awaiting operation. In addition, terminal 10 repeatedly performs the reception awaiting operation. The time length of reception awaiting period 32 is, for example, about 10 minutes. Although this case is described as an example, the time length of reception awaiting period 32 is not limited to the example.

It should be noted that when terminal 10 is embodied as, for example, a typical smartphone, communication performed by communicator 11 corresponds to one of the functions that an operating system (OS) provides to application software (also referred to as an app), and communication controller 12 corresponds to the app. In this case, typically, after control 31 is performed on communicator 11 and communicator 11 performs the reception awaiting operation, the highest priority is given to determination by the OS, regarding whether to continue the reception awaiting operation. The reception awaiting operation may be terminated by the OS regardless of whether control by the app is present. Thus, in order to continuously perform the reception awaiting operation, under the condition that divided reception awaiting periods are provided, starting of the reception awaiting operation by control 31 may be periodically repeated.

The lower part of FIG. 2 illustrates timings of weighting 33 and control 34 performed by scale 20 and advertising period 35.

When scale 20 transmits the advertising signal after weighting 33, communication controller 22 performs control 34 to cause communicator 21 to transmit the advertising signal. In this case, communicator 21 transmits the advertising signal in advertising period 35 that is a predetermined period starting when control 34 is performed on communicator 21. When advertising period 35 ends, communicator 21 stops transmitting the advertising signal. The time length of advertising period 35 is, for example, about 10 minutes. Although this case is described as an example, the time length of advertising period 35 is not limited to the example.

When terminal 10 performing the reception awaiting operation receives the advertising signal from scale 20, processing to establish a BLE connection between scale 20 and terminal 10 is performed, and data communication 37 can be performed. Data communication 37 can include transmission of the data from scale 20 to terminal 10.

Figure 3:
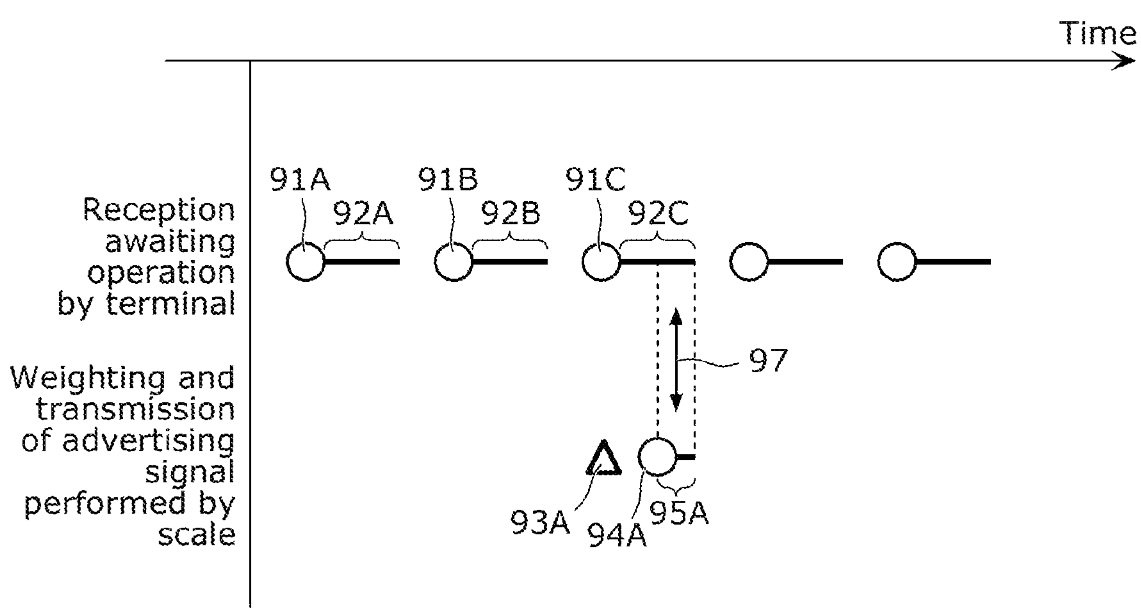
FIG. 3 is a first figure illustrating timings of operations performed by a terminal and a scale in a communication system in a comparison example.

FIG. 3 illustrates timings of operations performed by a terminal and a scale in a communication system in a comparison example.

The communication system in the comparison example is similar to communication system 1. However, in the comparison example, the terminal does not set periods (the first period, the second period, and the third period described above) related to the operation of a communicator, or control the operation by using the above periods. In this respect, the communication system in the comparison example differs from communication system 1.

The terminal sequentially performs, at certain time intervals, control 91A, control 91B, and control 91C to perform the reception awaiting operation. In this way, the terminal performs the reception awaiting operation during each of reception awaiting periods 92A, 92B, and 92C.

The scale performs weighting 93A of a user and control 94A to transmit an advertising signal after generating data including a measured value. In this way, the scale transmits the advertising signal in advertising period 95A.

Here, reception awaiting periods 92A and 92B do not overlap advertising period 95A. Thus, the terminal ends the reception awaiting operation without receiving the advertising signal in reception awaiting periods 92A and 92B.

After the start of reception awaiting period 92C, advertising period 95A starts. Advertising period 95A overlaps reception awaiting period 92C. Thus, the terminal in reception awaiting period 92C receives the advertising signal from the scale at a relatively early point in time in advertising period 95A. As a result, a BLE connection is established between the terminal and the scale in a relatively short time after the scale starts advertising period 95A, and data communication 97 is performed.

Figure 4:
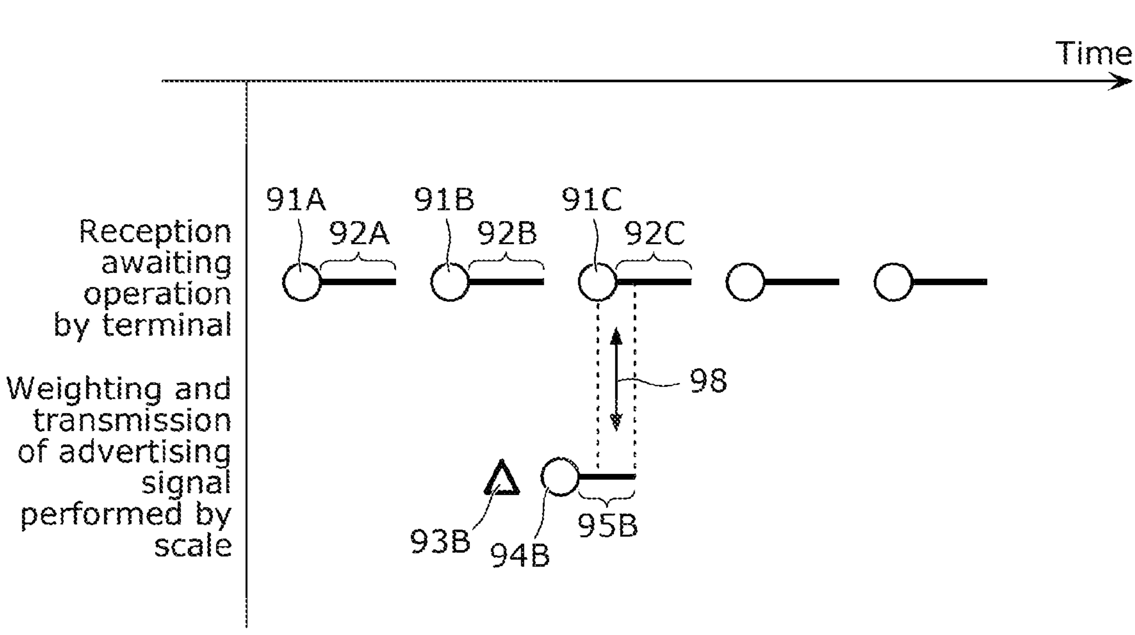
FIG. 4 is a second figure illustrating timings of operations performed by a terminal and a scale in a communication system in a comparison example.

FIG. 4 is a second figure illustrating timings of operations performed by a terminal and a scale in a communication system in a comparison example.

As with the case illustrated in FIG. 3, the terminal sequentially performs control 91A, 91B, 91C to perform the reception awaiting operation. In this way, the terminal performs the reception awaiting operation during each of reception awaiting periods 92A, 92B, and 92C.

As with the case illustrated in FIG. 3, the scale performs weighting 93B of a user and control 94B to transmit an advertising signal after generating data including a measured value. In this way, the scale transmits the advertising signal in advertising period 95B. Here, the timing of control 94B is earlier than that of control 94A in FIG. 3.

As with the case illustrated in FIG. 3, reception awaiting periods 92A and 92B do not overlap advertising period 95B. Thus, the terminal ends the reception awaiting operation without receiving the advertising signal in reception awaiting periods 92A and 92B.

After the start of advertising period 95B, reception awaiting period 92C starts. Advertising period 95B overlaps reception awaiting period 92C. Thus, the terminal in reception awaiting period 92C receives the advertising signal from the scale at a relatively late point in time in advertising period 95B. As a result, a BLE connection is established between the terminal and the scale after a relatively long time after the scale performs weighting 93B (or starts advertising period 95B), and data communication 98 is performed. The timing of data communication 98 in advertising period 95B is later than that of data communication 97 in FIG. 3.

Thus, in the comparison examples, depending on the timing at which the scale transmits the advertising signal, the timing of data transmission from the time point at which the scale weighted the user (or from the start of the advertising period) may be late. In addition, it may not be able to establish a connection in the advertising period, depending on the time intervals of control to perform the reception awaiting operation by the terminal or the time length of the reception awaiting period.

Figure 5:
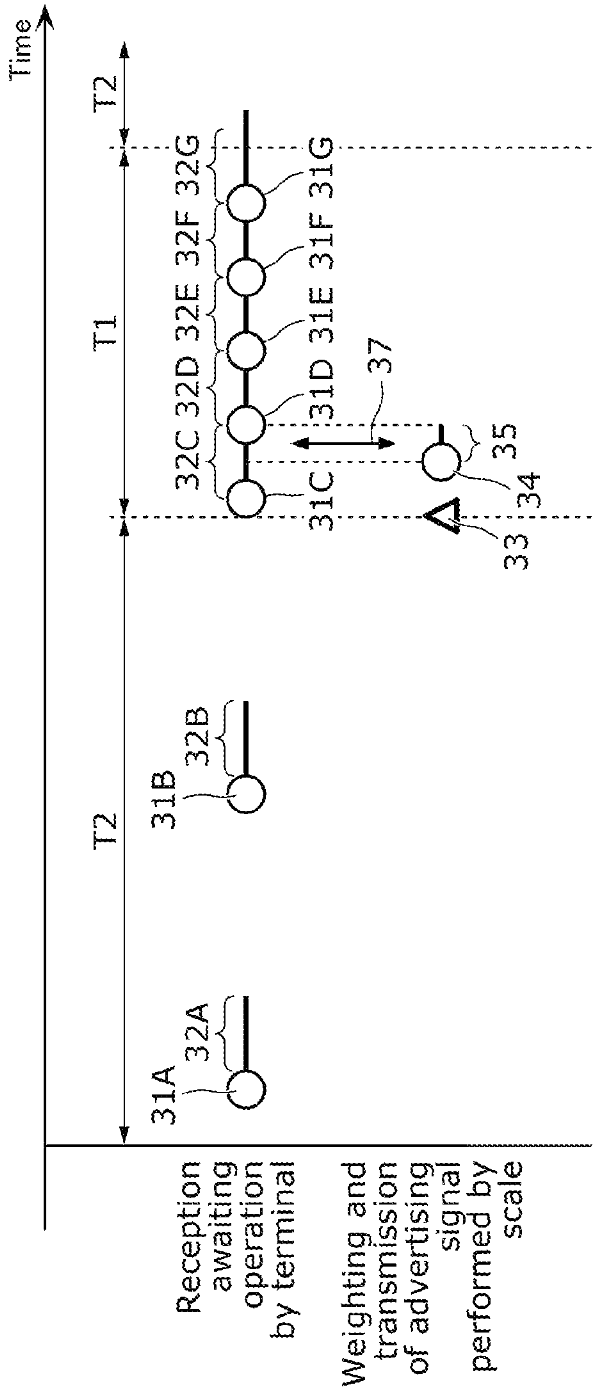
FIG. 5 is a first figure illustrating timings of operations performed by the terminal and the scale in the communication system in the embodiment.

FIG. 5 is a first figure illustrating timings of operations performed by terminal 10 and scale 20 in communication system 1 in the embodiment.

FIG. 5 illustrates timings of the reception awaiting operation by terminal 10 and timings of weighting and transmission of the advertising signal by scale 20, in first period T1 and second period T2.

Specifically, in first period T1, terminal 10 sequentially performs control 31C, control 31D, control 31E, control 31F, and control 31G to perform the reception awaiting operation. In this way, the terminal performs the reception awaiting operation during each of reception awaiting periods 32C, 32D, 32E, 32F, and, 32G. The frequency of control 31C to control 31G corresponds to the first frequency. Each time interval between control 31C to control 31G to perform the reception awaiting operation is set to be shorter than the time length of each of reception awaiting periods 32C to 32G (the time interval is set to, for example, 5 minutes). Thus, the reception awaiting operation is performed consecutively and seamlessly.

In addition, in second period T2, terminal 10 sequentially performs control 31A and control 31B to perform the reception awaiting operation. In this way, terminal 10 performs the reception awaiting operation during each of reception awaiting period 32A and 32B. The frequency of control 31A and control 31B corresponds to the second frequency. The time interval between control 31A and control 31B to perform the reception awaiting operation is set to be longer than the time length of each of reception awaiting periods 32A and 32B (the time interval is set to, for example, 30 minutes). Thus, a time interval is provided between reception awaiting periods 32A and 32B.

Scale 20 performs weighting 33 of the user, generates data including a measured value, and then performs control 34 to transmit an advertising signal. In this way, scale 20 transmits the advertising signal in advertising period 35.

Here, advertising period 35 overlaps reception awaiting period 32C. Thus, terminal 10 in reception awaiting period 32C receives the advertising signal from scale 20 at a relatively early point in time in advertising period 35. As a result, a BLE connection is established between terminal 10 and scale 20 in a relatively short time after scale 20 starts advertising period 35, and data communication 37 is performed.

In first period T1, terminal 10 consecutively and seamlessly performs the reception awaiting operation, which enables data communication 37 at a relatively early point in time in advertising period 35.

In addition, terminal 10 performs the reception awaiting operation less frequently in second period T2 than in first period T1. In other words, terminal 10 performs the reception awaiting operation at a low frequency in second period T2. Thus, even when scale 20 transmits the advertising signal in second period T2, scale 20 may be able to transmit the data although the timing of transmission may be a relatively late point in time in advertising period 35.

Figure 6:
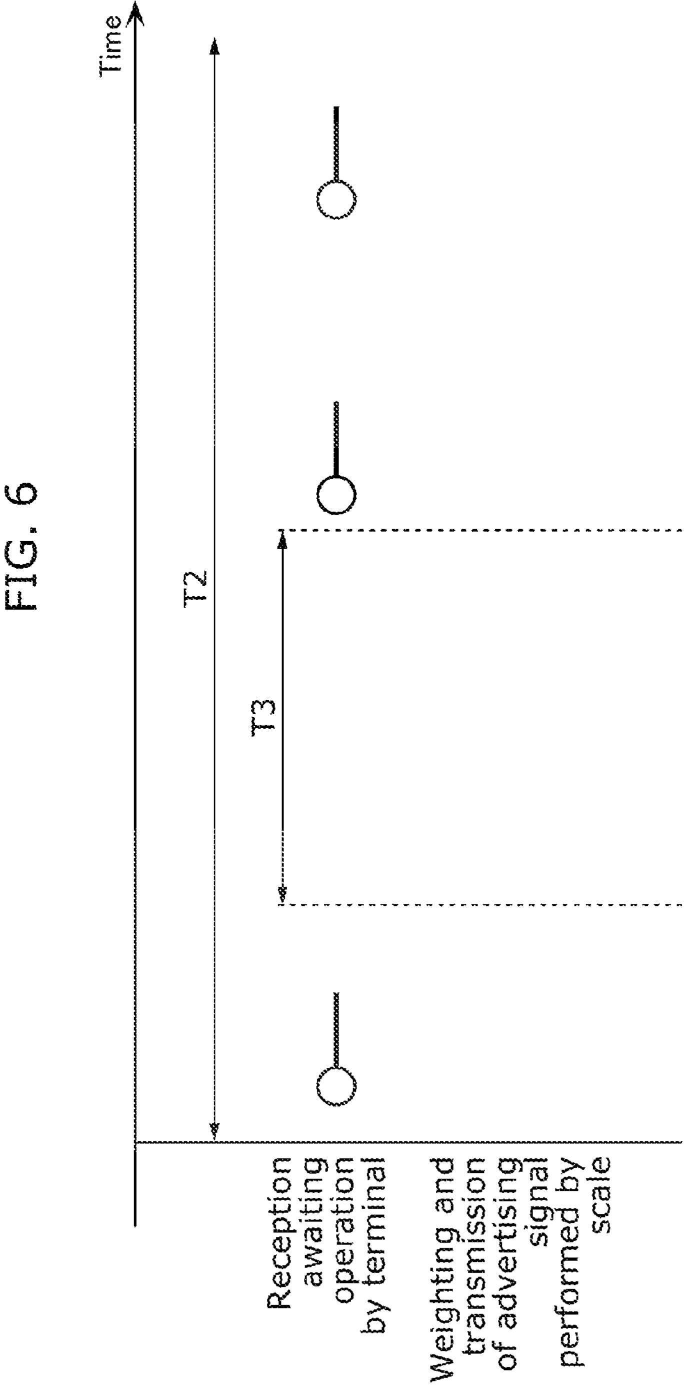
FIG. 6 is a second figure illustrating timings of operations performed by the terminal and the scale in the communication system in the embodiment.

FIG. 6 is a second figure illustrating timings of operations performed by terminal 10 and scale 20 in communication system 1 in the embodiment.

FIG. 6 illustrates timings of the reception awaiting operation by terminal 10 and timings of weighting and transmission of the advertising signal by scale 20, in second period T2 and third period T3.

As illustrated in FIG. 6, in third period T3, terminal 10 does not perform control to perform the reception awaiting operation. Thus, terminal 10 does not perform the reception awaiting operation in third period T3. In other words, terminal 10 prohibits performance of the control to perform the reception awaiting operation, and thus prohibits performance of the reception awaiting operation. In this way, it is possible to suppress power consumption in third period T3.

FIG. 7 illustrates an example of a connection history in the embodiment. Processing, performed by communication controller 12, to set the first period and the other periods is described with reference to FIG. 7.

FIG. 7 illustrates, for each time slot in a day, the number of times a BLE connection was established between terminal 10 and scale 20. Here, as an example, 24 time slots including the time slot of 12:00 a.m. to 12:59 a.m., the time slot of 1:00 a.m. to 1:59 a.m., . . . , the time slot of 11:00 p.m. to 11:59 p.m. are used as time slots in a day. The total number of connections established between terminal 10 and scale 20 is 30.

In the example illustrated in FIG. 7, the number of connections from 5:00 a.m. to 5:59 a.m. is one, the number of connections from 6:00 a.m. to 6:59 a.m. is 25, the number of connections from 7:00 a.m. to 7:59 a.m. is two, and the number of connections from 8:00 a.m. to 8:59 a.m. is two. The number of connections established in the other time slots is zero. The connection history is a connection history of scale 20 used by a user who usually measures their weight after getting up or before breakfast.

Communication controller 12 can set, as one or more first periods, one or more time slots in which a connection is established relatively many times. The one or more time slots in which a connection is established relatively many times include, for example, a time slot that includes a large part (e.g., at least 80% or 90%) of the number of connections. For instance, as the first period, communication controller 12 can set the time slot of 6:00 a.m. to 6:59 a.m. that includes 80% of the total number of connections.

It should be noted that the one or more time slots in which a connection is established relatively many times may be two or more time slots that include a large part (e.g., at least 80% or 90%) of the number of connections. As the first periods, communication controller 12 may set the two or more time slots that include 90% of the total number of connections. The two or more time slots are, for instance, the time slot starting at 6:00 a.m. and the time slot starting at 7:00 a.m. or the time slot starting at 6:00 a.m., the time slot starting at 7:00 a.m., and the time slot starting at 8:00 a.m.

In addition, as a third period, communication controller 12 can set a time slot in which the number of connections is zero. In this case, as the third periods, communication controller 12 sets the time slot starting at 12:00 a.m. to the time slot starting at 4 a.m. and the time slot starting at 9:00 a.m. to time slot starting at 11:00 p.m.

It should be noted that as the third period, communication controller 12 may set a time slot that is a time slot in a day, in which the number of connections is zero and the number of connections in the time slots before and after the time slot is also zero. In this case, as the third periods, communication controller 12 sets the time slot starting at 12:00 a.m. to the time slot starting at 3 a.m. and the time slot starting at 10:00 a.m. to the time slot starting at 11:00 p.m.

By setting the first period and the other periods in the above manner, communication controller 12 can properly set the reception awaiting periods for communicator 11.

Figure 8:
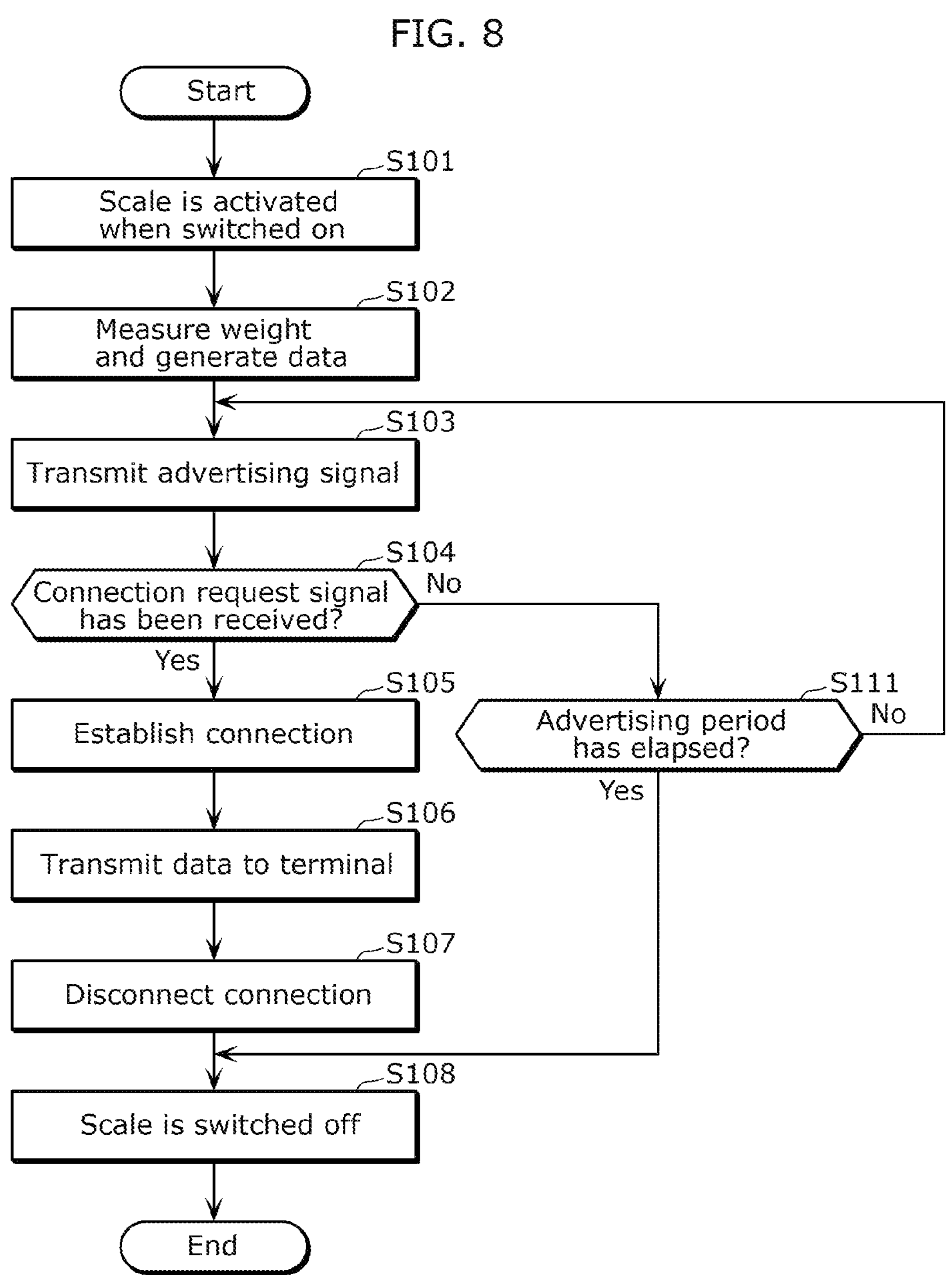
FIG. 8 is a flowchart illustrating a first example of processing performed by the scale in the embodiment.

FIG. 8 is a flowchart illustrating a first example of processing performed by scale 20 in the embodiment. The flowchart illustrated in FIG. 8 illustrates processing in which scale 20 weights the user and transmits data including the measured value of the weight to terminal 10.

In step S101, scale 20 is activated when switched on. Scale 20 is switched on by, for example, user operation.

In step S102, scale 20 weights the user. Data generator 23 generates data including a measured value indicating the weight of the user weighted by scale 20.

In step S103, communicator 21 transmits an advertising signal under control of communication controller 22. The time when step S103 is performed the first time is the start of an advertising period.

In step S104, communicator 21 determines whether a connection request signal has been received from terminal 10. The connection request signal is a signal for terminal 10 that has received the advertising signal transmitted in step S103 to request scale 20 to establish a BLE connection. When communicator 21 determines that the connection request signal has been received (Yes in step S104), the procedure proceeds to step S105, and if it is not the case (No in step S104), the procedure proceeds to step S111.

In step S105, communicator 21 establishes a BLE connection with terminal 10 in accordance with the connection request signal received in step S104.

In step S106, data generator 23 transmits the data generated in step S102 to terminal 10 through the connection established in step S105.

In step S111, communication controller 22 determines whether the advertising period has elapsed. More specifically, when the time length of the advertising period has elapsed since step S103 was performed the first time, communication controller 22 determines that the advertising period has elapsed. When communication controller 22 determines that the advertising period has elapsed (Yes in step S111), the procedure proceeds to step S108, and if it is not the case (No in step S111), the procedure proceeds to step S103.

In step S107, communicator 21 disconnects the connection established in step S105.

In step S108, scale 20 is switched off. It should be noted that when the advertising period has elapsed without communicator 21 receiving the connection request signal in step S104 (Yes in step S111), scale 20 is switched off in a state in which data generator 23 holds the data generated in step S102.

Figure 9:
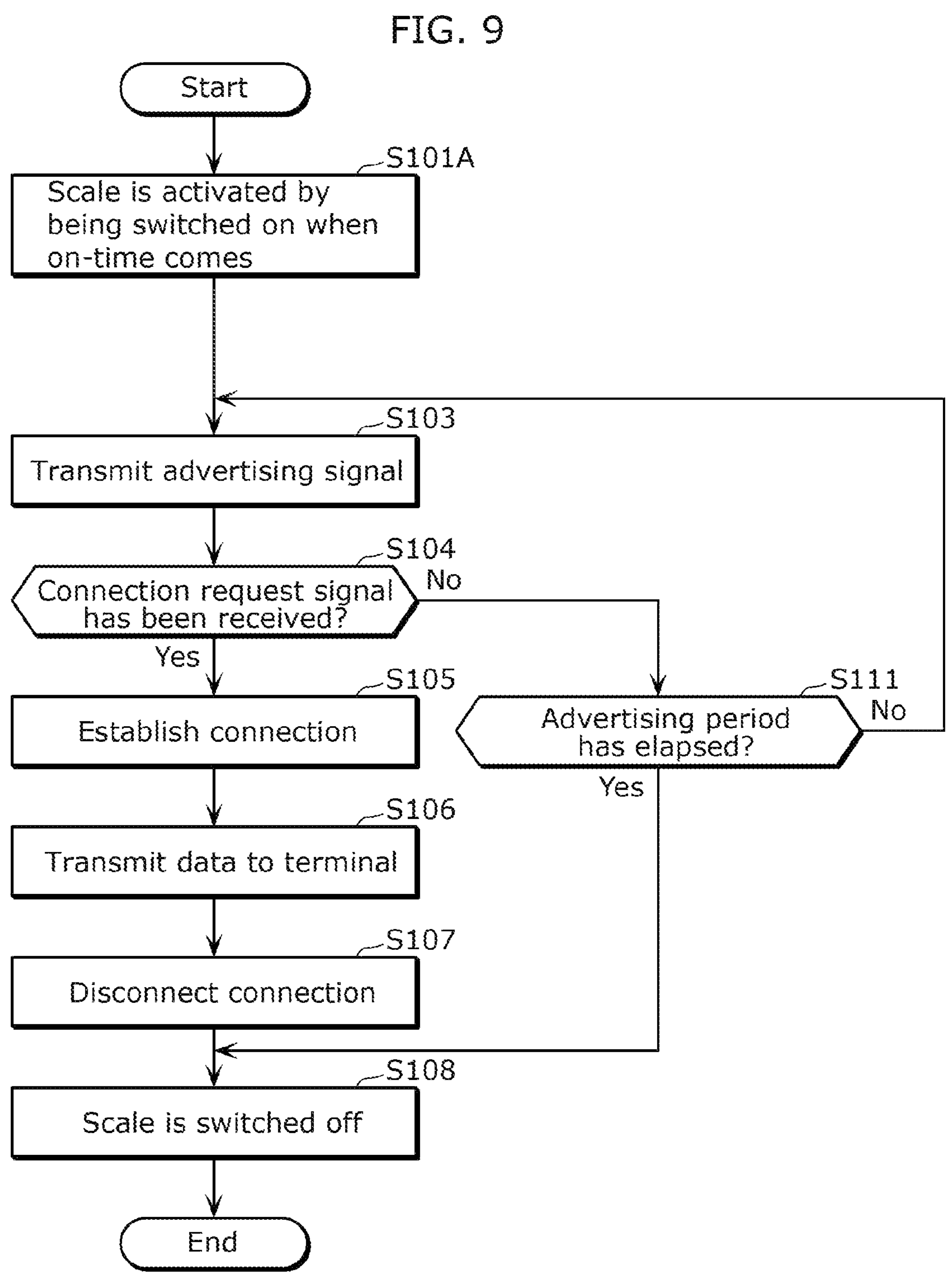
FIG. 9 is a flowchart illustrating a second example of the processing performed by the scale in the embodiment.

FIG. 9 is a flowchart illustrating a second example of the processing performed by scale 20 in the embodiment. The flowchart illustrated in FIG. 9 illustrates processing in which scale 20 is activated by being switched on when on-time comes, and then transmits, to terminal 10, the data that is held by data generator 23 and has not been transmitted yet.

It should be noted that processing steps similar to those illustrated in FIG. 8 are assigned the reference signs used in FIG. 8 and detailed explanations are omitted.

In step S101A, communicator 21 is activated by scale 20 being switched on when the on-time comes.

After step S101A, communicator 21 transmits an advertising signal without scale 20 weighting the user (step S103), and establishes a connection when receiving a connection request signal (steps S104 and S105).

In step S106, through the connection established in step S105, communicator 21 transmits, to terminal 10, the data held by data generator 23 (that is, the data generated in the past and yet to be transmitted to terminal 10).

Then, communicator 21 disconnects the connection, and scale 20 is switched off (steps S107 and S108).

Figure 10:
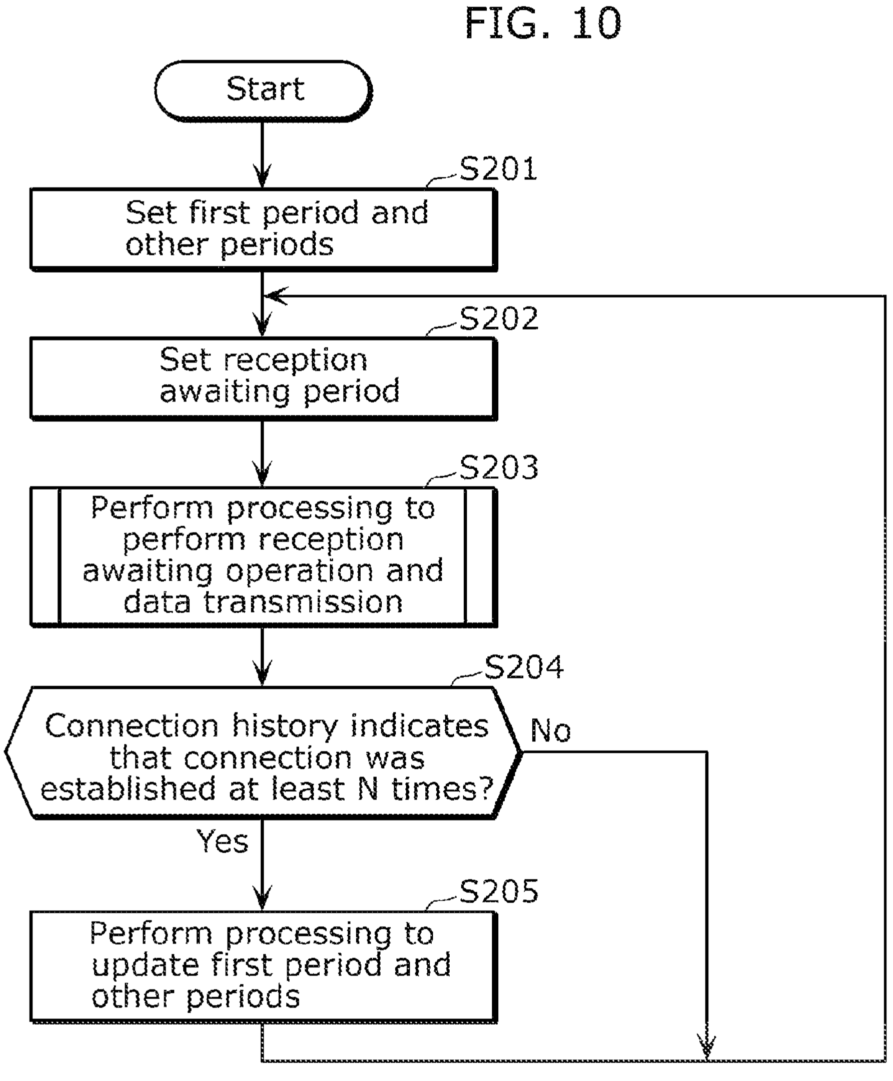
FIG. 10 illustrates a first example of processing performed by the terminal in the embodiment.

FIG. 10 illustrates a first example of processing performed by terminal 10 in the embodiment. The flowchart illustrated in FIG. 10 illustrates processing for terminal 10 to set the first period and the other periods and reception awaiting periods and processing to update the first period and the other periods.

In step S201, communication controller 12 sets the first period and the other periods. Specifically, communication controller 12 sets at least the first period. Communication controller 12 sets the second period by setting the first period. In addition, communication controller 12 may set the third period. The method of setting the first period and the other periods is described above with reference to FIG. 7.

In step S202, communication controller 12 sets the reception awaiting periods on the basis of the first period and the other periods set in step S201. Communication controller 12 sets the reception awaiting periods in the first period to be continuous time-wise, that is, seamless time-wise.

In step S203, terminal 10 performs processing to perform the reception awaiting operation and data transmission. The processing included in step S203 is described later in detail.

In step S204, communication controller 12 determines whether the connection was established at least N times. When communication controller 12 determines that the connection was established at least N times (Yes in step S204), the procedure proceeds to step S205, and if it is not the case (No in step S204), the series of processing illustrated in FIG. 10 ends. It should be noted that N is, for example, 30 for a device expected to be used around once a day, as in the case of scale 20. N may be set according to the use frequency of the device.

In step S205, communication controller 12 performs processing to update at least the first period. Specifically, communication controller 12 updates the first period and the other periods by setting the first period and the other periods in a method similar to the method of setting the first period and the other periods in step S201.

Figure 11:
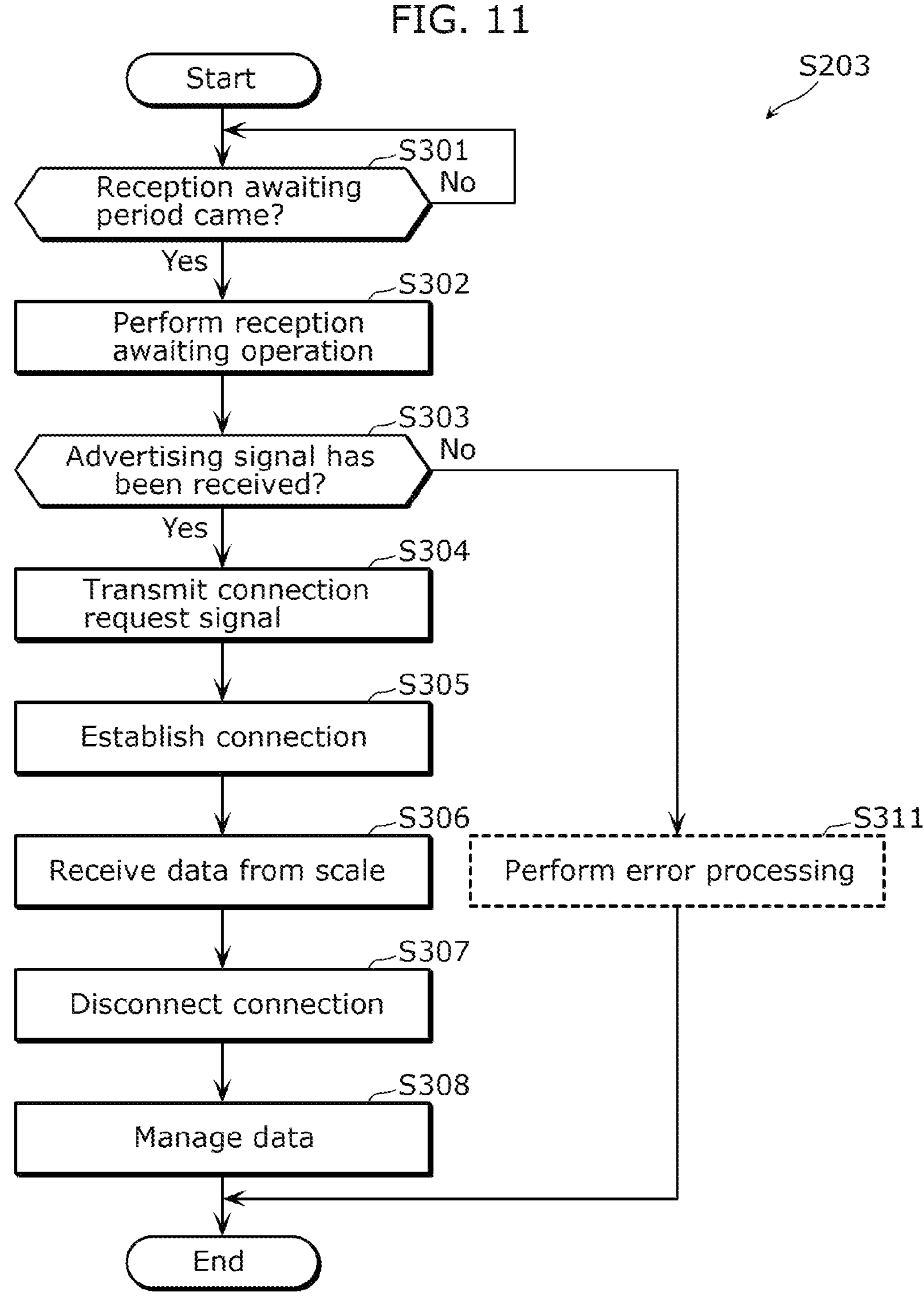
FIG. 11 illustrates a second example of the processing performed by the terminal in the embodiment.

FIG. 11 illustrates a second example of the processing performed by terminal 10 in the embodiment. The flowchart illustrated in FIG. 11 illustrates the processing included in step S203 in FIG. 10, more specifically, the processing in which terminal 10 receives and stores the data generated by scale 20 and including the measured value of the weight of the user.

In step S301, communication controller 12 determines whether a reception awaiting period has come. When communication controller 12 determines that the reception awaiting period has come, the procedure proceeds to step S302, and if it is not the case, step S301 is performed again. That is, communication controller 12 waits in step S301 until the reception awaiting period comes.

In step S302, communication controller 12 performs control to cause communicator 11 to perform the reception awaiting operation. Thus, communicator 11 performs the reception awaiting operation. The time when step S302 is performed corresponds to the start of the reception awaiting period.

In step S303, communicator 11 determines whether an advertising signal has been received in the reception awaiting period. The advertising signal can be the advertising signal transmitted by scale 20 in step S103 (see FIG. 6 or 7).

In step S304, communication controller 12 performs control to cause communicator 11 to transmit a connection request signal to scale 20, in response to reception of the advertising signal in step S303. Communicator 11 transmits the connection request signal to scale 20.

In step S305, communicator 11 establishes a BLE connection with scale 20. It should be noted that establishment of a BLE connection can be expressed as successful establishment of a BLE connection.

In step S306, data manager 13 receives the data from scale 20 through the connection established in step S305.

In step S307, communicator 11 disconnects the connection established in step S305.

In step S308, data manager 13 manages the data received in step S306.

In step S311, terminal 10 may perform error processing. The error processing includes processing to present information to the user in order to facilitate future establishment of a BLE connection. The information presented to the user includes, for example, information indicating proper setting content or a proper setting procedure regarding terminal 10 or scale 20. The information may be presented when the first period and the other periods have not been set yet. The user may not have understood the proper use of terminal 10 or scale 20. In such a case, by presenting the information, it may be possible to facilitate understanding of the proper use.

In addition, if the first period and the other periods have been already set, the error processing may include processing to reset the set first period and other periods. There may be a case in which the set first period and other periods no longer match user's living habits because of the change of the user's living habits. In such a case, by resetting the periods, it is possible to set the first period and the other periods that match user's new living habits.

It should be noted that the processing in step S311 can be considered as processing performed when establishment of a BLE connection fails. This is because not receiving an advertising signal in the reception awaiting period (No in step S303) can be expressed as failure of establishment of the BLE connection.

After step S308 or S311, the series of processing illustrated in FIG. 11 ends.

As above, the embodiment is described as an example of the technique in the present disclosure. For this reason, the appended drawings and the detailed descriptions are provided.

Accordingly, the structural elements illustrated in the appended drawings and described in the detailed descriptions may include not only structural elements essential to address the issues but also structural elements provided to exemplify the above implementation although not essential to address the issues. Thus, even if the structural elements that are not essential are recited in the appended drawing and the detailed descriptions, the structural elements that are not essential should not be easily considered as essential structural elements.

Since the above embodiment is provided to exemplify the technique in the present disclosure, for example, various changes, replacement, addition, and omission can be performed within the claims or the equivalent scope thereof.

INDUSTRIAL APPLICABILITY

The present disclosure is applicable to a terminal that performs short-range wireless communication with a device.

REFERENCE SIGNS LIST

1 communication system
10 terminal
11, 21 communicator
12, 22 communication controller
13 data manager
20 scale
23 data generator
31, 31A, 31B, 31C, 31D, 31E, 31F, 31G, 34, 91A, 91B, 91C, 94A, 94B control
32, 32A, 32B, 32C, 32D, 32E, 32F, 32G, 92A, 92B, 92C reception awaiting period
33, 93A, 93B weighting
35, 95A, 95B advertising period
37, 97, 98 data communication
T1 first period
T2 second period
T3 third period

The invention claimed is:

1. A communication control method executed by a terminal that performs short-range wireless communication with a device, the communication control method comprising:

setting a first period by using a plurality of timings of connections established by the terminal via the short-range wireless communication in response to a notification signal from the device, the first period being a period in which the terminal performs a reception awaiting operation to await a new notification signal from the device;

performing the reception awaiting operation at a first frequency in the first period set; and performing the reception awaiting operation at a second frequency less frequent than the first frequency in a second period other than the first period set.

2. The communication control method according to claim 1, wherein in the performing of the reception awaiting operation at the first frequency, the terminal consecutively performs the reception awaiting operation.

3. The communication control method according to claim 1, wherein in the setting of the first period, one or more time slots in a day that include the plurality of timings of the connections are set as one or more first periods, each of which is the first period.

4. The communication control method according to claim 3, further comprising:

obtaining position information on a position of the terminal in association with a time slot in a day, wherein in the setting of the first period, one or more time slots that are included in a day and in which the terminal is at a position at which the terminal is able to perform the short-range wireless communication with the device are further set as the one or more first periods.

5. The communication control method according to claim 1, further comprising:

setting a third period that is a time slot in which the terminal has not established the connections before, the third period being a time slot in a day included in the second period; and prohibiting the terminal from performing the reception awaiting operation in the third period set.

6. The communication control method according to claim 1, further comprising:

obtaining position information on a position of the terminal;

determining, using the position information, whether the terminal is at a position at which the terminal is able to perform the short-range wireless communication with the device; and prohibiting the terminal from performing the reception awaiting operation, when the terminal is determined not to be at the position at which the terminal is able to perform the short-range wireless communication with the device.

7. The communication control method according to claim 1, wherein the terminal includes a communicator that performs the short-range wireless communication with the device, when performing the reception awaiting operation in the first period, control to start the reception awaiting operation is repeatedly performed on the communicator at the first frequency in the first period, and the control is repeatedly performed at the second frequency in the second period.

8. The communication control method according to claim 1, wherein the device is a measurement instrument, and when receiving the new notification signal during the reception awaiting operation, the terminal establishes a connection via the short-range wireless communication in response to the new notification signal, and receives, via the short-range wireless communication, data generated as a result of measurement by the device.

9. The communication control method according to claim 1, wherein the short-range wireless communication is a wireless communication complying with a Bluetooth (registered trademark) low energy (BLE) standard.

10. A communication control method of a communication system including a device and a terminal that performs short-range wireless communication with the device, wherein the terminal executes the communication control method according to claim 1.

11. The communication control method according to claim 10, wherein the device is a measurement instrument and transmits the notification signal in a predetermined period after measurement, and the terminal receives the notification signal from the device and sets the first period by using the notification signal received.

12. The communication control method according to claim 11, wherein the device measures time periods that have been taken to establish the connections since the device transmitted the notification signal, sets a length of time of the predetermined period by using the time periods measured, and transmits the notification signal by using the length of time set.

13. A terminal that performs short-range wireless communication with a device, the terminal comprising:

a communicator that performs the short-range wireless communication with the device; and a communication controller that sets a first period by using a plurality of timings of connections established by the terminal via the short-range wireless communication in response to a notification signal from the device, the first period being a period in which the communicator performs a reception awaiting operation to await a new notification signal from the device, wherein the communicator performs the reception awaiting operation to await the new notification signal from the device, at a first frequency in the first period set and at a second frequency less frequent than the first frequency in a second period other than the first period set.

14. A communication system comprising:

the terminal according to claim 13; and the device that performs the short-range wireless communication with the terminal.

* * * * *